United States Patent [19]

Takahashi

[11] Patent Number: 5,472,334
[45] Date of Patent: Dec. 5, 1995

[54] INJECTION MOLDING DIE FOR INJECTION-MOLDING BASE BOARDS

[75] Inventor: Mitsuo Takahashi, Matsudo, Japan

[73] Assignee: Seikoh Giken Co., Ltd., Matsudo, Japan

[21] Appl. No.: 128,666

[22] Filed: Sep. 30, 1993

[30] Foreign Application Priority Data

Mar. 23, 1993 [JP] Japan ..................... 5-087952

[51] Int. Cl.⁶ ................................................. B29C 45/38
[52] U.S. Cl. ...................... 425/554; 264/163; 264/328.7; 425/553; 425/590; 425/810
[58] Field of Search ...................... 425/553, 554, 425/590, 810, 556; 264/328.7, 154, 163

[56] References Cited

U.S. PATENT DOCUMENTS

| | | | |
|---|---|---|---|
| 2,725,079 | 11/1955 | Streed et al. | 285/416 |
| 3,142,868 | 8/1964 | Blount | 425/11 |
| 3,228,096 | 1/1966 | Albro | 285/55 |
| 3,897,296 | 7/1975 | Waldrum | 156/309.9 |
| 3,907,049 | 9/1975 | Baffas | 285/55 |
| 3,909,049 | 9/1975 | Blantica | 285/416 |
| 3,968,552 | 7/1976 | Hunter | 285/55 |
| 3,989,436 | 11/1976 | McNeely et al. | 425/810 |
| 4,018,863 | 4/1977 | Schneiders et al. | 264/249 |
| 4,290,456 | 4/1981 | Ahrbeck | 285/416 |
| 4,302,183 | 11/1981 | Pero | 432/225 |
| 4,372,741 | 2/1983 | Cane et al. | 425/556 |
| 4,457,886 | 7/1984 | Acda et al. | 264/249 |
| 4,525,319 | 6/1985 | Kaspe | 264/322 |
| 4,715,804 | 12/1987 | Takahashi | 425/141 |
| 4,772,196 | 9/1988 | Asai | 425/810 |
| 4,847,094 | 7/1989 | Parmann | 264/249 |
| 4,879,082 | 11/1989 | Kudo et al. | 425/810 |
| 4,933,036 | 6/1990 | Shaposka et al. | 156/309.9 |
| 4,979,891 | 12/1990 | Kitamura | 425/556 |
| 4,997,613 | 3/1991 | McMillan | 264/249 |
| 5,078,827 | 1/1992 | Calderwood | 156/304.2 |
| 5,094,795 | 3/1992 | McMillan et al. | 264/249 |
| 5,098,281 | 3/1992 | Kitamura | 425/554 |
| 5,105,524 | 4/1992 | Darling | 264/249 |
| 5,297,951 | 3/1994 | Asai | 425/810 |

FOREIGN PATENT DOCUMENTS

| | | | |
|---|---|---|---|
| 60-245529 | 12/1985 | Japan | 425/554 |
| 3-90324 | 4/1991 | Japan | 425/554 |

OTHER PUBLICATIONS

*Installation and Fabrication Manual*, Dow Chemical Company, pp. 20–24. No Date.
PCT Publication No. WO 89/0821. Sep. 1989.

*Primary Examiner*—James P. Mackey
*Attorney, Agent, or Firm*—Spencer, Frank & Schneider

[57] ABSTRACT

To produce base boards each usable for an information recording medium such as a photoelectromagnetic disc or the like by employing an injection molding process, an injection molding die of the type comprising a die half on the stationary side and a die half on the movable side includes a cylindrical supporting member on the stationary side, a die assembly on the stationary side arranged in the cylindrical supporting member, a cylindrical supporting member on the movable side, a die assembly on the movable side arranged in the cylindrical supporting member, a cylindrical guide member located between both the cylindrical members, a first driving unit for displacing the die half on the movable side, and a second driving unit for actuating an ejector sleeve. Each injection-molding operation is achieved by way of the steps of filling a cylindrical die cavity with a pressurized molten resin, forming a center hole through a molded product of base board, holding the die cavity in the fully closed state, and then re-compressing the molded produce of base board by actuating the first driving unit. While the step of re-compressing is executed, the molded product of base board is squeezed against the die cavity and the outer peripheral surface of a cut sleeve by a high inner pressure of the molten resin with the result that a final molded product of base board has a high density and exhibits a smooth surface on the center hole formed through the molded product of base board.

11 Claims, 5 Drawing Sheets

INJECTION MOLDING DIE FOR INJECTION-MOLDING BASE BOARDS

BACKGROUND OF THE INVENTION

1. Field of the Invention

The present invention relates generally to an injection molding die for injection-molding base boards usable for an information recording medium such as a photoelectromagnetic disc or the like. More particularly, the present invention relates to an improvement of an injection molding die of the foregoing type wherein the injection molding die not only improves the accuracy of a double refraction index by increasing a filled density of each molded product, but also improves an accuracy of a formation of a center hole through each molded product.

2. Description of the Related Art

In practice, there are two problems which are solved by the present invention relating to an injection molding die for injection-molding base boards usable for an information recording medium such as a photoelectromagnetic disc or the like.

One problem is concerned with further improvement of an accuracy of the dimensions of each molded product, as well as an accuracy of a center hole formed by a die component through each molded product, compared with a conventional injection molding die of the foregoing type.

The other problem is concerned with further improvement of an accuracy of a double refraction index of a base board as well as stamper pattern transference to each molded product.

To facilitate understanding of the present invention, typical conventional injection molding dies of the foregoing type will briefly be described below with reference to FIG. 4 to FIG. 7.

Figure 4:
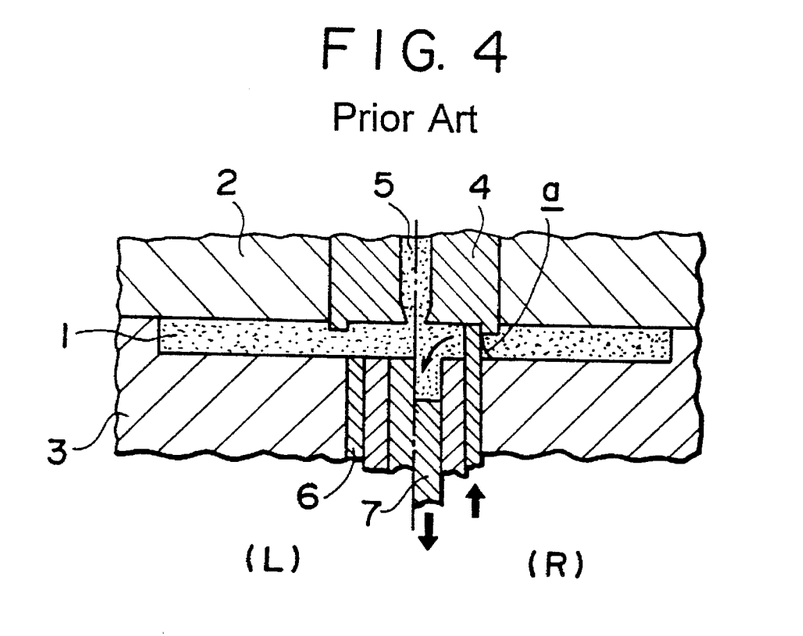
FIG. 4 is a fragmentary sectional view of a conventional injection molding die for injection-molding base boards, particularly illustrating a problem which arises when a center hole is formed through a base board in the injection molding die.

FIG. 4 is a fragmentary sectional view of a conventional injection molding die for injection-molding base boards as disclosed by Japanese Patent Application Laid-Open Publication No. 60-23970 (corresponding to U.S. Pat. No. 4,372, 741), particularly illustrating a problem which arises when a center hole is formed through each base board in the injection molding die.

Specifically, FIG. 4 illustrates the operative state of the left-hand side L of the injection molding die wherein a molten resin 1 fills a cylindrical die cavity defined between a die half 2 on a stationary side, and a die half 3 on a movable side. The resin 1 is injected through an injection hole 5 formed through a nozzle bush 4 extending along the center axis of the injection molding die.

In addition, FIG. 4 illustrates the operative state of the right-hand side R of the injection molding die wherein a sleeve valve 6 is brought in contact with the lowermost end of nozzle bush 4 at the substantially same time the die cavity is fully filled with the molten resin 1, so that further feeding of the molten resin is instantaneously interrupted, and moreover, a center hole is formed through the fully filled layer of molten resin. In this case, an extra quantity of molten resin discharged from the die cavity by the upward displacement of sleeve valve 6 is permitted to freely flow only in the space formed by the downward displacement of a core pin 7, but is not permitted to flow outside of the outer peripheral surface of the sleeve valve 6. Thus, there arises a problem that the center hole exhibits a coarse appearance similar to that when formed by employing a punching process. Usually, an annularly extending convex plane is formed around the center hole as represented by reference character a.

Figure 5:
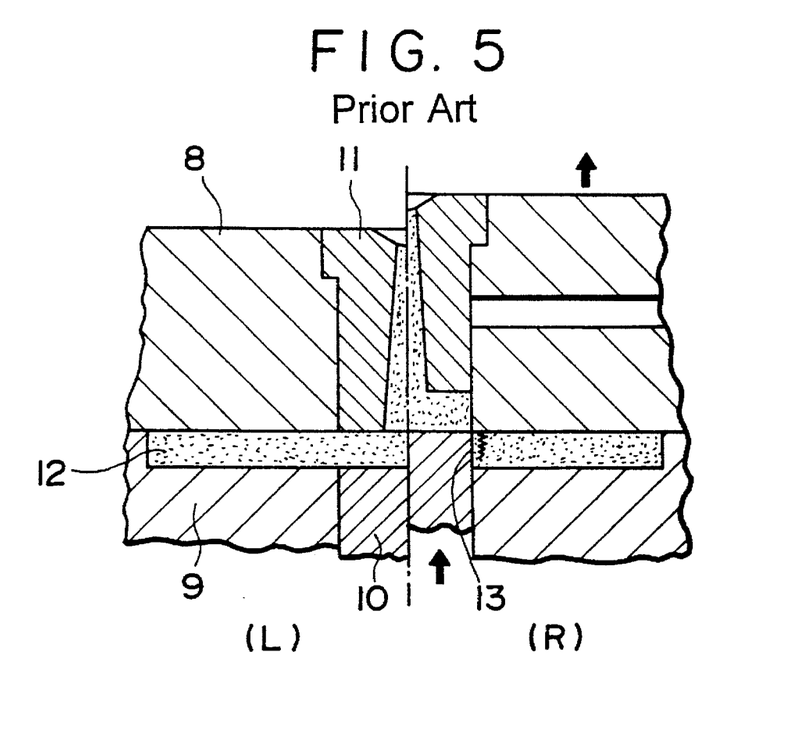
FIG. 5 is a fragmentary sectional view of another conventional injection molding die for injection-molding base boards, particularly illustrating a problem which arises when a center hole is formed through a base board in the injection molding die.

Next, FIG. 5 is a fragmentary sectional view of another conventional injection molding die for injection-molding base boards as disclosed in U.S. Pat. No. 3,989,436, particularly illustrating a problem which arises when a center hole is formed through each base board. In the drawing, reference numeral 8 designates a die half on the stationary side of the injection molding die. Reference numeral 9 designates a die half on the movable side, and reference numeral 10 designates a hole cut punch. Reference numeral 11 designates a nozzle bush, and reference numeral 12 designates a molded product of base board.

Specifically, FIG. 5 illustrates the operative state of the left-hand side L of the injection molding die before a center hole is formed through a molded product of base board by actuating hole cut punch 10. In addition, FIG. 5 illustrates the operative state of the right-hand side R of the injection molding die wherein nozzle bush 11 is displaced in a rearward direction, and at the same time, the hole cut punch 10 is displaced in a forward direction, causing a center hole 13 to be formed through the molded product of base board. Also in this case, since the center hole 13 is formed through the base board by displacing the hole cut punch 10 in the forward direction while displacing the nozzle bush 11 in the rearward direction under no load, there arises a problem that the center hole does not exhibit a smooth appearance but it exhibits a coarse appearance similar to that formed by forcible breakage caused by a punching process.

Figure 6:
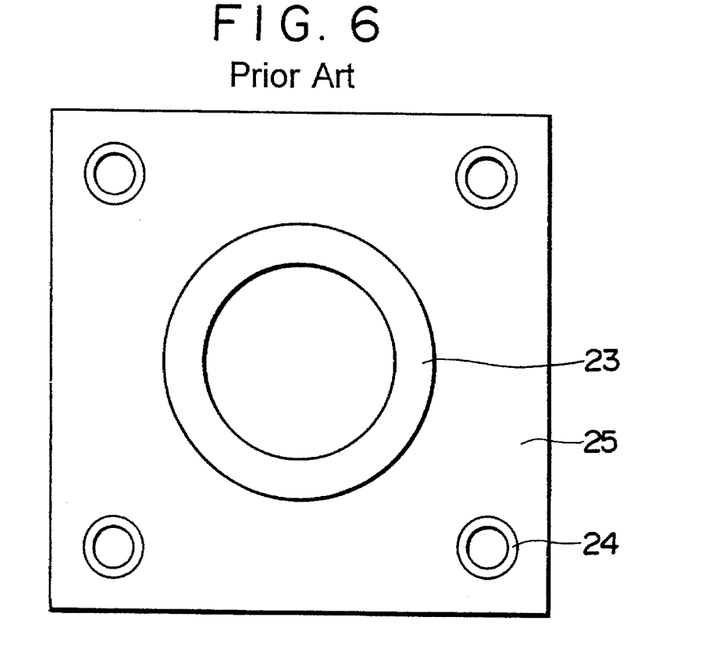
FIG. 6 is a plan view of a re-compressing type injection molding die for injection-molding base boards according to the prior invention proposed by common inventors to the present invention.
Figure 7:
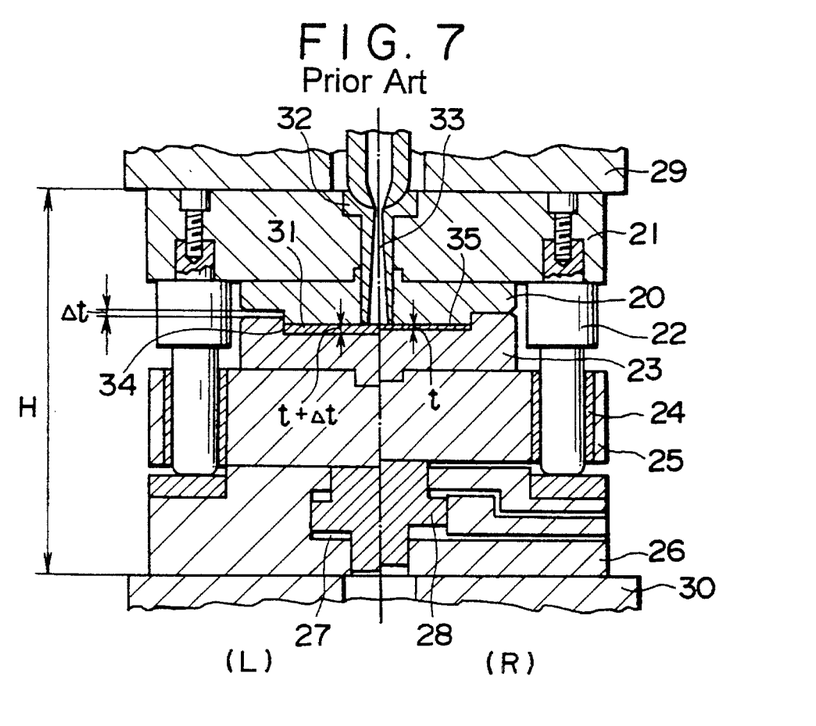
FIG. 7 is a sectional view of the injection molding die shown in FIG. 6, particularly illustrating a mode of operation of the injection molding die.

The inventors of the present invention conducted a variety of research and development experiments for improving the accuracy of a double refraction index, and invented a re-compressing type molding method (patented under U.S. Pat. No. 4,715,804) wherein a molten resin is injected in a cylindrical die cavity, and thereafter, a molded product of base board is re-compressed by tightening both die halves of an injection molding die. FIG. 6 and FIG. 7 show the injection molding die which was employed for practicing the re-compressing type molding method proposed by the inventors. FIG. 6 is a plan view of the injection molding die, and FIG. 7 is a sectional view of the injection molding die wherein the left-hand side L of the drawing illustrates the operative state of the injection molding die after completion of a primary molding step, and the right-hand side R of the drawing illustrates the operative state of the same when a molded resin of base board molded by the primary molding step is re-compressed.

A characterizing feature of the re-compressing type molding method consists in that a density of each base board can be increased by re-compressing a molded product of base board molded by the primary molding step while the die cavity is kept closed. Moreover, a double refraction index does not fluctuate by uniforming the density of the filled molded product of base board over its entire area. Another characterizing feature of the same consists in that a dimensional accuracy, a surface roughness, and a flatness of a center hole formed through the base board can be improved by employing the re-compressing type molding method.

In FIG. 7, reference numeral 20 designates a die half on the stationary side of an injection molding die for molding base boards. As is apparent from the drawing, the die half 20 is constructed as a die assembly fixedly secured to a base plate 21. Reference numeral 22 designates four column-shaped guide posts each serving to support a die tightening pressure.

A die half 23 on the movable side of the injection molding die is likewise constructed in the form of a die assembly held on a movable plate 25. Four guide bushes 24 are press-fitted through the movable plate 25 in an axial direction so as to allow the movable plate 25 to slidably move along guide posts 22. Die half 23 can be displaced in an axial direction by a hydraulic unit 27 arranged in a base plate 26 on the movable side using re-compressing. To accomplish this, a piston 28 of the hydraulic unit 27 is operatively connected to the die half 23 via the baseplate 26.

As shown in FIG. 7, while the base plate 21 is fixedly secured to a platen 29 of an injection molding machine (not shown), and the base plate 26 is fixedly secured to a platen 30 of the same, a molten resin is injected into a die cavity 31 through an injection hole 33 formed through a nozzle bush 32 to execute a primary molding step. On completion of the primary molding step, a primarily molded product 34 is obtained within the injection molding die composed of the die half 20 and the die half 23. At this time, a distance H between the platen 29 for the die half 20 and the platen 30 for the die half 23 on the movable side is kept constant during the primary molding step with the aid of the four guide posts 22.

On completion of the primary molding step, a gap $\subset t$ corresponding to a distance corresponding to the recompression, is reserved between the die half 20 on the stationary side and the die half 23 on the movable side so as to execute a secondary molding step. Thus, when it is assumed that a final thickness of each base board is represented by t, the thickness of the primarily molded product is represented by $t+\Delta t$. Usually, the gap $\Delta t$ is set to 10 to 20% of the final thickness t.

Subsequently, a secondary molding step is executed. The piston 28 in the hydraulic unit 27 is driven in the upward direction with a predetermined recompression pressure so that the die half 23 is brought in tight contact with the die half 20, causing the gap $\Delta t$ to be reduced to zero, whereby a molded product of base board 35 is obtained.

After completion of the secondary molding step, a center hole is formed through the base board 35 by actuating a hole cutting punch (not shown). Subsequently, the die half 23 is separated from the die half 20 so as to allow molded product of base board 35 to be removed from the injection molding die, thus completing a single molding cycle.

With the injection molding die constructed in the above-described manner, the filled density of a molded product of base board can be increased by re-compressing a primarily molded product after completion of the primary molding step. However, this known injection molding die has a few problems as noted below.

According to the prior invention, four guide posts 22 are arranged for the injection molding die as die tightening pressure supporting members. However, it has been found that the center axis of both die assemblies is not positionally coincident with the center axis among the four guide posts 22 due to temperature differences unavoidably arising between both die assemblies (attributable to the fact that the temperature of the die assembly on the stationary side is usually kept higher than that of the die assembly on the movable side), resulting in some positional error being induced with the conventional injection molding die. In addition, the guide bushes 24 are forcibly fit into the movable plate 25 while the foregoing positional non-coincident state is maintained, causing an excessively high intensity of bending stress when the guide posts 22 are fitted through the guide bushes 24. This results in the fitting surface of each guide bush 24 being readily damaged or injured.

As mentioned above, according to the prior invention, each molding operation is performed using the primary molding step, the secondary molding step accompanied by re-compressing, and the formation of a center hole through the molded base board. However, since the secondary molding step accompanied by the re-compressing is executed while the nozzle bush in communication with the die cavity, the compressive stress induced in both die assemblies during the secondary molding step is transferred to the nozzle bush, resulting in the uniformity of the density of an inner periphery of the molded product of base board being adversely affected.

In addition, since it is necessary that the injection molding machine be equipped not only with a hydraulic unit exclusively employable for achieving the re-compressing but also with a hydraulic unit exclusively employable for forming the center hole through each base board, a sequence of actuation of the two hydraulic units and an actuation time of each should separately be controlled, resulting in a controlling unit for the injection molding machine becoming unavoidably complicated in structure.

SUMMARY OF THE INVENTION

The present invention has been made in consideration of the aforementioned background.

An object of the present invention is to provide an injection molding die for injection-molding base boards each usable for an information recording medium such as a photoelectromagnetic disc or the like wherein each molded product of base board can be produced being an improved accuracy of a double refraction index, as well as the formation of a center hole through the molded product of base board.

Another object of the present invention is to provide an injection molding die for injection-molding base boards wherein each molded product of base board can be produced with an increased density without any fluctuation of a double refraction index over the whole area of the base board.

A further object of the present invention is to provide an injection molding die for injection-molding base boards wherein a center hole can be formed through the molded base board with a high dimensional accuracy and with reduced surface roughness.

The present invention provides an injection molding die for injection-molding base boards each usable for an information recording medium such as a photoelectromagnetic disc or the like wherein each base board is injection-molded in a cylindrical die cavity defined between a die half on the stationary side fixedly secured to a platen on the stationary side of an injection molding machine and a die half on the movable side fixedly secured to a platen on the movable side of the injection molding machine, wherein injection molding die includes a cylindrical supporting member on the stationary side integrally secured to a base plate on the stationary side; a die assembly on the stationary side arranged in the cylindrical supporting member on the stationary side and fixedly secured to the base plate on the movable side while including the die half on the stationary side, the die assembly on the stationary side further including a nozzle bush and a flange bush serving as a stamper holding member, and the nozzle bush and the flange bush being fitted through the die half on the stationary side in the coaxial relationship; a cylindrical supporting member on the movable side integrally secured to a base plate on the movable side; a die assembly on the movable side arranged in the cylindrical supporting member on the movable side and operatively fitted to the base plate on the stationary side while including the die half on the movable side, the die assembly on the movable side further including an ejector sleeve, a cut sleeve, an ejector pin, a floating member and a movable plate, the ejector sleeve, the cut sleeve and the ejector pin being fitted through the die half on the movable side in the coaxial relationship, the floating member being slidably fitted around the die half on the movable side and normally biased toward the die half on the stationary side by the resilient force of the first spring means while defining the outer peripheral surface of the cylindrical die cavity, and the ejector sleeve and the cut sleeve being normally biased away from the die half on the stationary side by the resilient force of second and third spring means; a cylindrical guide member located between the cylindrical supporting member on the stationary side and the cylindrical supporting member on the movable side for correctly aligning the die assembly on the stationary side with the die assembly on the movable side while defining a minimum distance between the die assembly on the stationary side and the die assembly on the movable side; first driving means for displacing the die half on the movable side together with the ejector sleeve, the cut sleeve and the ejector pin via the movable plate; and second driving means for actuating the ejector sleeve so as to remove a molded product of base board away from the cylindrical die cavity; whereby each injection-molding operation is achieved by way of a first step of filling the cylindrical die cavity with pressurized molten resin fed through the nozzle bush to produce a primarily molded product of base board, a second step of forming a center hole through the primarily molded product of base board by actuating the cut sleeve via the first driving means, a third step of holding the cylindrical die cavity in the fully closed state, and a fourth step of re-compressing the primarily molded product of base board by additionally actuating the first driving means by a distance corresponding to a quantity of re-compression to produce a secondarily molded product of base board.

The movable plate of the die assembly on the movable side is normally biased by the resilient force of fourth spring means disposed in the base plate on the movable side so that the movable plate comes in contact with the base board on the movable side while the first driving means is not actuated.

Usually, the first driving means is prepared in the form of a hydraulic unit composed of a hydraulic cylinder and a hydraulic piston slidably received in the hydraulic cylinder. It is convenient from the viewpoint of practical designing that the first driving means is arranged in the base plate on the movable side.

On the other hand, it is recommended that the second driving means be prepared in the form of a pneumatic unit composed of a pneumatic cylinder and a pneumatic piston slidably received in the hydraulic cylinder. Similarly, the second driving means is preferably arranged in the movable plate of the die assembly on the movable side.

In practice, on completion of the first step, the primarily molded product of base board has a thickness equal to a normal thickness of each base board plus a quantity of re-compression, and on completion of the fourth step, the secondarily molded product of base board has a thickness equal to the normal thickness of each base board.

Usually, the first spring means for the floating member, the second spring means for the ejector sleeve and the third spring means for the cut sleeve are prepared in the form of a compression coil spring, while the fourth spring means for the movable plate is prepared in the form of plural sets of cup springs arranged in the base plate on the movable side.

When both the die assemblies are tightened together to assume a die closed state, a certain gap remains between a stamper and the floating member so as to enable the cylindrical die cavity to be evacuated therethrough.

To ensure that a spool runner is easily removed from the nozzle bush when a molded product of base board is removed from the cylindrical die cavity, it is recommended that an inverted taper portion be formed at the foremost end of the cut sleeve on the inner diameter side of the latter so as to seize part of a spool runner therewith on completion of the fourth step.

Other objects, features and advantages of the present invention will become apparent from reading the following description which has been made in conjunction with the accompanying drawings.

BRIEF DESCRIPTION OF THE DRAWINGS

The present invention is illustrated in the following drawings in which:

FIGS. 3(A), 3(B) and (C) are fragmentary sectional views of the injection molding die shown in FIG. 1, particularly illustrating a step of forming a center hole through a base board in the injection molding die;

DESCRIPTION OF THE PREFERRED EMBODIMENT

The present invention will now be described in detail hereinafter with reference to the accompanying drawings which illustrate a preferred embodiment thereof.

Figure 1:
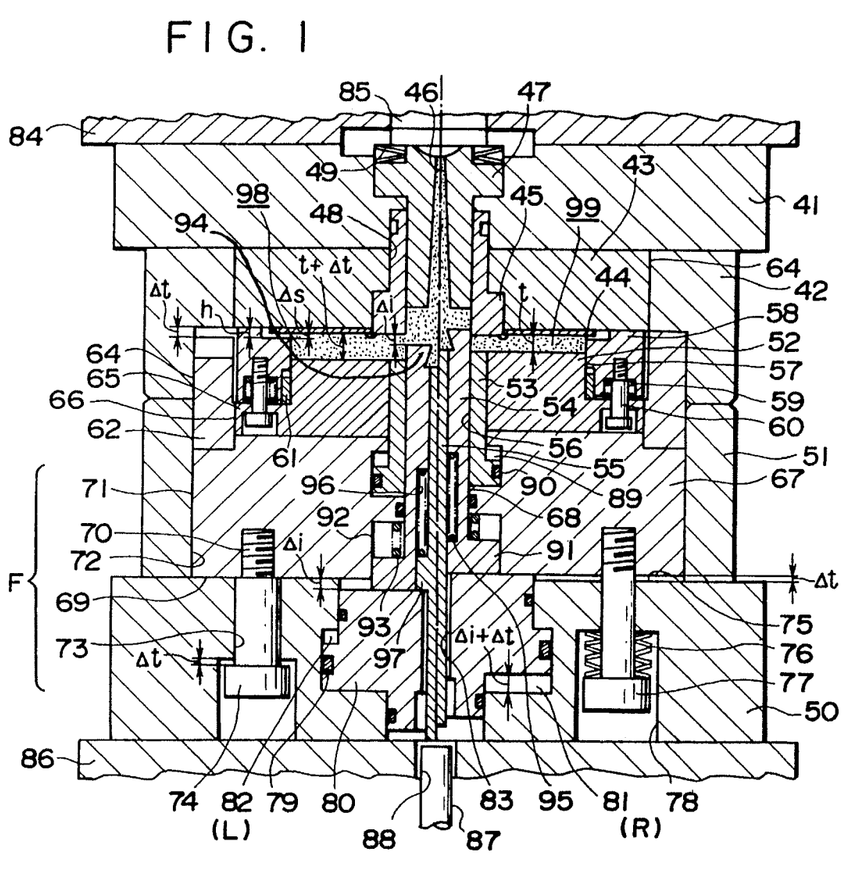
FIG. 1 is a sectional view of an injection molding die for injection-molding base boards each usable for an optical disc according to an embodiment of the present invention.

FIG. 1 is a sectional view of an injection molding die for injection-molding base boards according to the embodiment of the present invention wherein the left-hand side L of the injection molding die illustrates the operative state wherein a primary molding step is executed with the injection molding die being tightly kept closed, and the right-hand side R of the same illustrates the operative state wherein a secondary molding step is executed under the influence of re-compression while the injection molding die is likewise tightly kept closed.

The injection molding die includes a stationary side die assembly comprising a base plate 41 on which a stationary die half 43 and a cylindrical supporting member 42 are fixedly mounted in a coaxial relationship.

A through hole 48 is formed through die half 43. A stamper plate attaching/detaching flange bush 45 is fitted through the hole 48 in a coaxial relationship.

A stamper plate 44 is held in the die cavity while it is attached to the stamper plate attaching/detaching flange bush 45.

In addition, an injection hole 46 is formed through a nozzle bush 47 along the center axis of the die half 43. A molten resin is injected through the injection hole 46.

The stamper plate attaching/detaching flange bush 45 and the nozzle bush 47 are accurately fitted into a cylindrical hole of the supporting member 42, and are fixedly secured to tile base plate 41 to constitute a part of the stationary side die assembly.

A biasing device is provided, comprising a cup spring 49 for normally biasing the nozzle bush 47 in the downward direction, and for allowing the nozzle bush 47 to be retracted within a range of 0 to 2 mm. Cup spring 49 is disposed on the upper end surface of the nozzle bush 47.

If an annular film gate gap is set small, e.g., 0.5 mm or less, the biasing device is not required. In this case, the nozzle bush 47 may be fixedly secured to the base plate 41.

A movable side supporting member 51 is arranged on a base plate 50 corresponding to the supporting member 42 to constitute a movable side die assembly.

A central hole 56 is formed in the movable side die half 52 along the center axis of the latter. An ejector sleeve 53, a cut sleeve 54 and an ejector pin 55 are fit into the central hole 56 in a coaxial relationship so that they move in the axial direction.

A stepped part and a cylindrical portion 57 are formed around the outer peripheral surface of the die half 52.

A floating member 58 is arranged around the cylindrical portion 57 of the die half 52 so as to enable the floating member to move in the upward/downward direction by the resilient force of a plurality of compression springs 59. Compression springs 59 are disposed on a plurality of rod pins 60 arranged on the stepped part of the die half 52 in an equally spaced relationship as seen in the circumferential direction.

To define an outer diameter of each molded product of base board, a predetermined gap Δs (usually ranging from about 0.01 to 0.02 mm) is uniformly kept around the floating member 58, serving to evacuate the die cavity.

A cylindrical bearing 61 is disposed between the floating member 58 and the die half 52 around the outer peripheral surface of the floating member 58.

The die half 52 and a guide member 62 are fixedly mounted on the upper surface of a movable plate 67. The guide member 62 is cylindrically shaped, and includes an outer diameter surface 64 and an inner diameter surface 65. An inner diameter surface 72 common to the supporting member 42 and the supporting member 51 is accurately fit onto the outer diameter surface 64 of the guide member 62, while an outer diameter surface 66 of die half 52 is accurately fit into the inner diameter surface 65 of the guide member 62.

A through hole 68 is formed through the central part of the movable plate 67 for receiving the ejector sleeve 53, the cut sleeve 54 and the ejector pin 55.

A plurality of female-threaded holes 70 are formed on a lower surface 69 of the movable plate 67 for fixedly securing a base plate 50 to the movable plate 67.

An outer diameter surface 71 of the movable plate 67 is dimensioned so that the movable plate 67 can move in the axial direction, while being accurately fit into the inner diameter surface 72 of the supporting member 51. The outer diameter surface 71 of the movable plate 67 is fit into the inner diameter surface 72 of the supporting member 51. A plurality of bolts 74, each having a stepped part, are each inserted through a respective hole 73 formed through the base plate 50, and threadably fastened into the female-threaded holes 70 on the movable plate 67. A gap corresponding to a re-compressing stroke Δt between the stepped part of each bolt 74 and the stepped part of each hole 73 is maintained.

To ensure that a lower surface 69 of the movable plate 67 is normally biased so as to come in close contact with anupper surface 75 of the base plate 50, plural pairs of cup springs 76 are arranged on a plurality of fitting bolts 77. Fitting bolts 77 are inserted through a plurality of holes 78 and threadably fastened into the corresponding female-threaded holes on the movable plate 67.

A hydraulic cylinder 79 is formed in the base plate 50. A hydraulic piston 80 slidably received in the hydraulic cylinder 79 moves in the axial direction to drive the cut sleeve 54 and a die assembly F on the movable side.

A sequence of operation of the hydraulic piston 80 is preset such that pressurized oil delivered from a hydraulic pump (not shown) is fed to a lower chamber 81 of the hydraulic cylinder 79 so as to displace the hydraulic piston 80 in the upward direction. Subsequently, the feeding of the pressurized oil is shifted to an upper chamber 82 of the hydraulic cylinder so as to displace the hydraulic piston 80 in the downward direction.

A through hole 83 is formed through the hydraulic piston 80. A lower part of the ejector pin 55 is inserted through the hole 83.

In addition, a through hole 85 is formed through a platen 84 on the stationary side along the center axis of the injection molding die. An injection nozzle (not shown) of the injection molding machine is inserted into the hole 85. A through hole 88 is formed through a platen 86 on the movable side. An ejector rod 87 is inserted through the hole 88.

The present invention has been described above with respect to the embodiment wherein a hydraulic unit comprising the hydraulic cylinder 79 and the hydraulic piston 80 serves as a driving power source for the die assembly on the movable side, and is arranged in the base plate 50. Alternatively, the hydraulic unit may be incorporated in the movable platen 86 of the injection molding machine. Otherwise, it may be arranged between the movable platen 86 and the injection molding die.

A pneumatic cylinder 89 arranged in the movable plate 67 serves to displace the ejector sleeve 53 in the axial direction. A flange portion 90 of the ejector sleeve 53 serves as a piston for the pneumatic cylinder 89.

A flange portion 91 of the cut sleeve 54 is fit into a hole 92 formed at the lower part of the movable plate 67. The flange portion 91 of the cut sleeve 54 is normally biased in the downward direction by the resilient force of a compression spring 93 received in the hole 92.

An inverted taper portion 94 is formed at the upper end of the cut sleeve 54 on the inner diameter side of the latter so as to seize the lower end of a cut part of a molded product of base board.

A hole 96 for receiving a return spring therein is formed at the lower end part of the cut sleeve 54 on the inner diameter side of the latter.

The ejector pin 55 includes a flange portion 97 at a intermediate part thereof. The lower end part of the ejector pin 55 is inserted through the hole 83 of the hydraulic piston 80 so as to face an uppermost end of the ejector rod 87.

Next, a series of steps to be executed by the injection molding die constructed in the aforementioned manner will be described below with reference to FIG. 2 which has four sections IL, IR, IIL and IIR.

Figure 2:
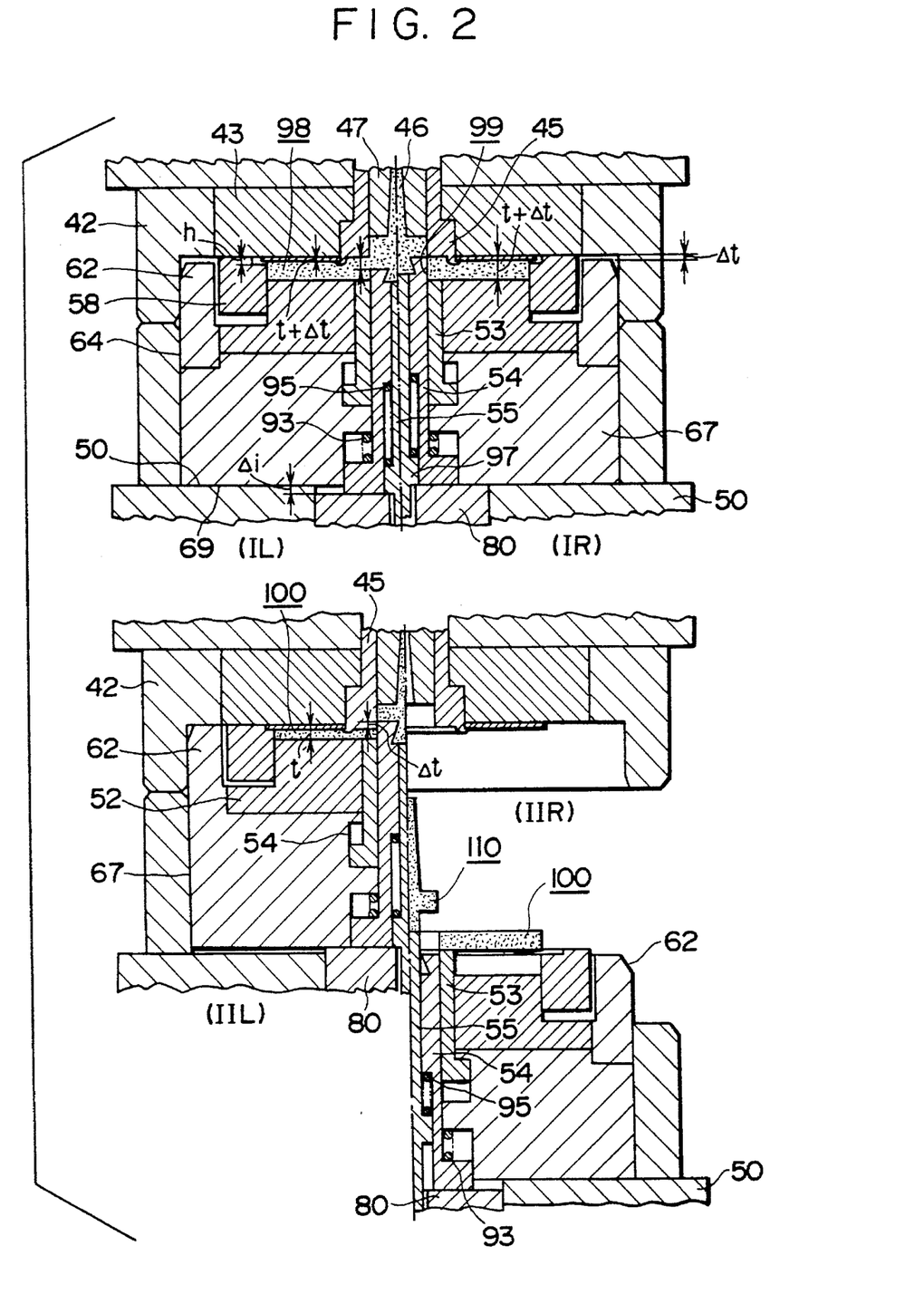
FIG. 2 is a sectional view of the injection molding die shown in FIG. 1, particularly illustrating a mode of operation of the injection molding die.

The section IL of FIG. 2 shows the operative state where the injection molding die executes a primary molding step.

In detail, the lower surface 69 of the movable plate 67 is retracted by the resilient force of the cup springs 76 (see FIG. 1), until the movable plate comes in close contact with the upper surface 75 of the base plate 50.

At this time, a gap Δi is formed between the upper end surface of the cut sleeve 54 and the lower surface of the flange bush 45. The cut sleeve 54 is biased by the resilient force of the compression spring 93 until the lower end surface of the cut sleeve 54 comes in close contact with the upper end surface of the hydraulic piston 80. At this time, the upper end surface of the hydraulic piston 80 is lowered to assume a depth ⊂i, and the ejector sleeve 53 is located at the lower dead point position as shown in the drawing.

In addition, the flange portion 97 of the ejector pin 55 is biased by the resilient force of a spring 95 until the lower end surface of the flange portion 97 comes in contact with the upper end surface of the hydraulic piston 80.

At the same time, a gap Δt corresponding to a re-compressing stroke is reserved between the upper end surface of the guide member 62 and the inner surface of the supporting member 42, i.e., the stepped part of the same.

The floating member 58 is biased by the resilient force of the compression spring 59 (see FIG. 1) so that the upper surface of the floating member 58 comes in close contact with the lower surface of the die half 43. At this time, the dimension h representing a stepped part formed at the upper surface of the floating member 58 is adjusted to exhibit a value derived from the sum of the gap Δs and the thickness of the stamper plate.

In this embodiment, the lower end surface of the nozzle bush 47 is projected downward of the lower end surface of the flange bush 45 by a distance of 1 mm (to reach the position having a depth of 1 mm as measured from above). While the foregoing positional state is maintained, the cylindrical die cavity defined between both the die halves 43 and 52 is fully filled with a pressurized molten resin by injecting the latter through an injection hole 46 of the nozzle bush 47 so that a primarily molded product 98 having a thickness of t+Δt is molded in the cylindrical die cavity.

The section IR of FIG. 2 shows the operative state where a center hole is formed through the primarily molded product 98. First, the lower surface of the cut sleeve 54, which has come in contact with the upper end surface of the hydraulic piston 80, is raised up by a distance Δi by feeding pressurized oil into the lower chamber 81 of the hydraulic cylinder 79. The cut sleeve 54 is raised up until the upper end surface of the cut sleeve 54 is flush with the lower end surface of the flange bush 45, thus forming a center hole 99 through the primarily molded product 98, and at the same time, interrupting a communication between the nozzle bush 47 and the cylindrical die cavity so as to close the cylindrical die cavity. At this time, the lower end surface of the cut sleeve 54 is flush with the lower end surface of the movable plate 67, thus completing a primary molding step.

The section IIL of FIG. 2 shows the operative state where the primarily molded product 98 is subjected to re-compressing.

As the hydraulic piston 80 is driven further from the operative state shown in the section IR of FIG. 2, the cut sleeve 54 is raised up together with the movable plate 67 by a distance corresponding to the gap Δt so that the gap Δt is reduced to zero. The upper end surface of the hydraulic piston 80 is brought in close contact with the lower end surface of the movable plate 67 without any possibility that the movable plate 67 and the hydraulic piston 80 are displaced further in the upward direction.

At this time, since the die half 52 is raised up together with the movable plate 67, the thickness t+Δt of the primarily molded product 98 is reduced by a quantity corresponding to the gap ⊂t so that a re-compressed product of base board 100 having a thickness t is produced.

On completion of the re-compressing, the upper end surface of the cut sleeve 54 is fit into the hole of the flange bush 45 by a distance ⊂t without any possibility that the cut sleeve 54 is displaced further in the upward direction.

Finally, the section IIR of FIG. 2 shows the operative state where the re-compressed product of base board 100 is completely removed from the injection molding die. After completion of the re-compression molding, the platen 86 (see FIG. 1) is retracted so that the injection molding die is opened. While the foregoing state is maintained, the ejector rod 87 (see FIG. 1) and the ejector sleeve 53 are simultaneously actuated so that the re-compressed product 100 and a spool runner 110 located at the central part of the injection molding die are taken out from the injection molding die.

Subsequently, the hydraulic piston 80 is restored to the initial position, and moreover, the movable plate 67 is restored to the initial position by the resilient force of the cup springs 76 (see FIG. 1) (i.e., the lower surface of the movable plate 67 is brought in close contact with the upper surface of the base plate 50). At the same time, the cut sleeve 54 is restored to the initial position by the resilient force of the compression spring 93, and the lower end surface of the cut sleeve 54 is brought in close contact with the upper end surface of the hydraulic piston 80.

As the ejector rod 87 is retracted, the ejector pin 55 is restored to its initial position by the resilient force of the return spring 95. The lower surface of the flange portion 97 of the ejector pin 55 is brought in contact with the upper surface of the hydraulic piston 80. Thus, a single molding cycle is completed. Since a mechanism for removing the re-compressed product of base board 100 away from the injection molding die can be designed based on any one of the hitherto known technical concepts and does not form any part of the present invention, detailed description on the mechanism will not be required.

Figure 3:
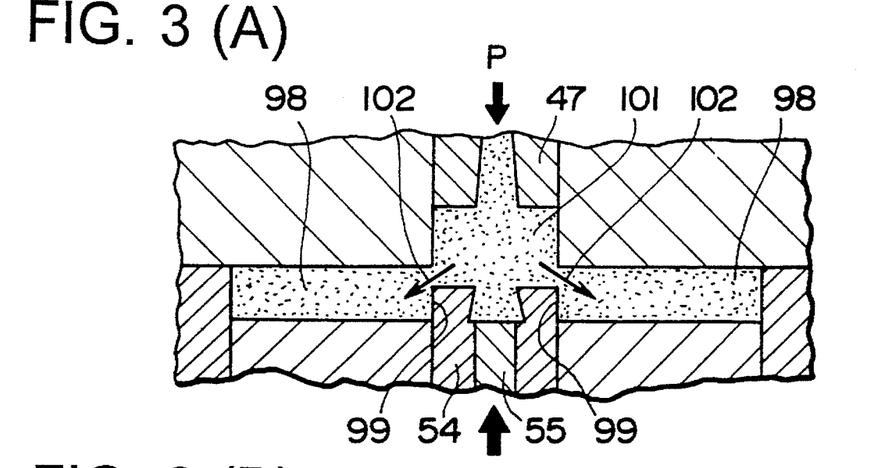

FIGS. 3(A), 3(B) and (C) illustrate by way of sectional views a process of forming a center hole through a molded product of base board in the injection molding die.

FIG. 3(A) is a fragmentary sectional view of the injection molding die which illustrates a first step of the foregoing process. As shown in the drawing, the cut sleeve 54 and the ejector pin 55 are raised up by actuating the hydraulic piston 80. At this time, a compressive stress P arises in a molten resin 101 contained between the nozzle bush 47 and the cut sleeve 54 while the nozzle bush 47 is normally biased in the downward direction by the resilient force of the cup spring 49. Thus, the molten resin 101, having a volume corresponding to the displacement of the cut sleeve 54 in the upward direction, is forcibly caused to flow in the die cavity which has a lower pressure, through an annular film gate 102 as represented by arrow marks in the drawing.

In this respect, the injection molding die of the present invention is different from the conventional injection molding die described above with reference to FIG. 4 wherein an extra quantity of molten resin flows in the hollow space due to the forcible displacement of the core pin 7 in the downward direction. The molten resin 101 is compressed by the cut sleeve 54 by the circular edge of the cut sleeve 54. Thus, the compressed molten resin 101 is caused to increasingly flow in the cylindrical die cavity as the center hole 99 is formed through the molded product of base board, resulting in the center hole 99 being formed without any elongation of the molten resin. On completion of the formation of the center hole 99, the axial cut surface of the center hole 99 exhibits smooth shear appearance.

FIG. 3(B) is a fragmentary sectional view of the injection molding die which illustrates the operative state where the center hole 99 has been formed through the primarily molded product of base board. It should be noted that the axial cut surface of the center hole 99 has a surface roughness of about $10_\mu$ at this time, which means that the center hole 99 does not exhibit a completely smooth surface.

FIG. 3(C) is a fragmentary sectional view of the injection molding die which illustrates the operative state where the re-compressing has been completed while the injection molding die is kept closed. Since the pressure is applied in all directions to the primarily molded product of base board during the re-compressing as represented by arrow marks in the drawing, the center hole 99 is brought in tight contact with the outer peripheral surface of the cut sleeve 54 (which has a surface roughness of about 0.1μ) with the result that the axial cut surface of the center hole 99 exhibits a very smooth appearance substantially equal to that of the outer peripheral surface of the cut sleeve 54.

While the present invention has been described above with respect to a single preferred embodiment thereof, it should of course be understood that the present invention should not be limited only to this embodiment but various changes or modifications may be made without any departure from the scope of the present invention as defined by the appended claims.

What is claimed is:

1. An injection molding die for injection-molding base boards in a cylindrical die cavity, comprising:
   (A) a movable side, including:
      (1) a first platen;
      (2) a first base plate;
      (3) a first cylindrical supporting member integrally secured to the first base plate; and
      (4) a first die assembly arranged in the first cylindrical supporting member and being operatively connected to the first base plate, including:
         (a) a first die half fixedly secured to the first platen;
         (b) an ejector sleeve;
         (c) a cut sleeve;
         (d) an ejector pin, said ejector pin, the ejector sleeve and cut sleeve being positioned within the first die half in a coaxial arrangement;
         (e) a floating member slidably positioned around the first die half to define an outer peripheral surface of the cylindrical die cavity; and
         (f) a movable plate;
   (B) a stationary side, including:
      (1) a second platen;
      (2) a second base plate;
      (3) a second cylindrical supporting member integrally secured to the second base plate; and
      (4) a second die assembly arranged in the second cylindrical supporting member and fixedly secured to the second base plate, including:
         (a) a second die half fixedly secured to the second platen, the first and second die halves defining a cylindrical die cavity therebetween;
         (b) a nozzle bush; and
         (c) a flange bush for supporting a stamper plate, said nozzle bush and flange bush being positioned within the second die half in a coaxial arrangement;
   (C) first spring means for biasing the floating member toward the second die half;
   (D) second spring means for biasing the ejector pin away from the second die half;
   (E) third spring means for biasing the cut sleeve away from the second die half;
   (F) cylindrical guide member means located between the first and second cylindrical supporting members for aligning the first die assembly with the second die assembly, said guide member means defining a minimum gap between the first and second die assemblies;
   (G) first driving means for moving the cut sleeve, the ejector pin, and the movable plate, said movable plate displacing the first die half and ejector sleeve; and
   (H) second driving means for actuating the ejector sleeve so as to remove a finished molded base board away from the cylindrical die cavity; whereby the cylindrical die cavity is filled with pressurized molten resin fed through the nozzle bush to produce a primarily molded base board, the cut sleeve is actuated by said first driving means to form a center hole through the primarily molded base board, the cylindrical die cavity is held in a fully closed state, and the first driving means is additionally activated to recompress the primarily molded product by a distance corresponding to a quantity of recompression to produce a secondarily molded base board, respectively.

2. An injection molding die as defined in claim 1, further comprising fourth spring means positioned in the first base plate for biasing the movable plate so that the movable plate contacts the first base plate when said first driving means is not actuated.

3. An injection molding die as defined in claim 1, wherein said first driving means comprises a hydraulic unit composed of a hydraulic cylinder and a hydraulic piston slidably received in the hydraulic cylinder.

4. An injection molding die as defined in claim 3, wherein said first driving means is arranged in the first base plate.

5. An injection molding die as defined in claim 1, wherein the second driving means comprises a pneumatic unit composed of a pneumatic cylinder and a pneumatic piston slidably received in the pneumatic cylinder.

6. An injection molding die as defined in claim 5, wherein said second driving means is arranged in the movable plate.

7. An injection molding die as defined in claim 1, wherein the primarily molded base board has a thickness equal to a sum of a thickness of the secondarily molded base board and the distance corresponding to the quantity of recompression, the secondarily molded base board thickness being equal to a thickness of the finished molded base board.

8. An injection molding die as defined in claim 1, wherein said first, second and third spring means each comprise a compression coil spring.

9. An injection molding die as defined in claim 2, wherein said fourth spring means comprise a plurality of cup springs arranged in the first base plate.

10. An injection molding die as defined in claim 1, wherein the stamper plate and the floating member define a gap for evacuating the cylindrical die cavity when the cylindrical die cavity is held in the fully closed state.

11. An injection molding die as defined in claim 1, wherein the cut sleeve has an end in a region of the stationary side, an inner diameter of the cut sleeve at the end comprises an inverted taper portion for seizing a portion of a sprue runner.

\* \* \* \* \*